United States Patent [19]

Robeson

[11] Patent Number: 4,730,018

[45] Date of Patent: Mar. 8, 1988

[54] SOLUTIONS OF POLY(ARYL ETHER SULFONES) IN CYCLOHEXANONE

[75] Inventor: Lloyd M. Robeson, Whitehouse Station, N.J.

[73] Assignee: Amoco Corporation, Chicago, Ill.

[21] Appl. No.: 794,564

[22] Filed: Nov. 4, 1985

[51] Int. Cl.[4] .................. C08G 51/34; C08G 51/44; C08G 51/46
[52] U.S. Cl. .................................. 524/360; 524/609
[58] Field of Search .............................. 524/360, 609

[56] References Cited

U.S. PATENT DOCUMENTS

| 3,875,103 | 1/1975 | Leslie | 524/609 |
| 3,993,843 | 11/1976 | Vasta | 524/609 |
| 4,321,174 | 3/1982 | Hoy et al. | 524/609 |
| 4,503,168 | 3/1985 | Hartsing, Jr. | 524/609 |

Primary Examiner—John Kight
Assistant Examiner—M. L. Moore
Attorney, Agent, or Firm—Donald M. Paguga; William H. Magidson; Ralph C. Medhurst

[57] ABSTRACT

Described herein is a solution comprising a select group of poly(aryl ether sulfones) dissolved in a cyclohexanone solvent. The solution is suitable for use in coatings or for casting into film.

8 Claims, No Drawings

SOLUTIONS OF POLY(ARYL ETHER SULFONES) IN CYCLOHEXANONE

FIELD OF THE INVENTION

This invention is directed to a solution comprising a select group of poly(aryl ether sulfones) dissolved in a cyclohexanone solvent. This solution is suitable for use in coatings or for casting into film.

BACKGROUND OF THE INVENTION

The following poly(aryl ether sulfone) polymers are commercially available. Victrex polyethersulfone (made by Imperial Chemical Industries PLC) contains repeating units of the following formula:

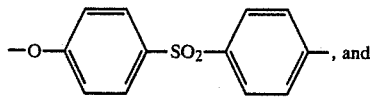

Udel polysulfone (made by Union Carbide Corporation) contains repeating units of the following formula:

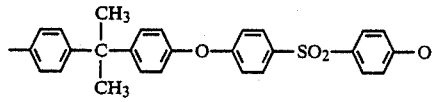

These poly(aryl ether sulfones) have a wide variety of end-use applications, including use in coatings and for casting into films. Film made from these poly(aryl ether sulfones) have a good combination of physical properties. However, the lack of low cost, low boiling and commercially available solvents for these polymers limits their use in films.

Since methylene chloride is an excellent solvent and widely employed commercially, there has been a desire to prepare solutions of poly(aryl ether sulfones) in methylene chloride for film applications. Such solutions, however, must be stable over long periods of time, i.e., have long shelf-life.

The problems which exist with poly(aryl ether sulfones) solutions in solvents such as methylene chloride have been succinctly summarized in U.S. Pat. No. 3,875,103 (column 1, lines 11 to 19) as follows:

"Solutions of thermoplastic amorphous aromatic polysulphones have hitherto suffered from instability leading to solutions having a short shelf-life. Such solvents are chlorinated hydrocarbons such as methylene chloride, chloroform, 1,1,2-trichloethane, and 1,2-dichloroethane. Alternatively, solvents which give solutions of the polysulphones having long shelf life have high boiling points, and are therefore difficult to remove."

It is known that poly(aryl ether sulfone) (I) precipitates out of a methylene chloride solution. When poly(aryl ether sulfone) (II) is dissolved in methylene chloride a precipitate forms (it takes several weeks) which must be filtered out if homogeneous films are to be prepared.

Thus, a new poly(aryl ether sulfone) was needed which would dissolve in solvents such as methylene chloride and remain in solution for extended periods of time. Such a poly(aryl ether sulfone) is described in U.S. patent application Ser. No. 536,843 filed Sept. 29, 1983 in the names of L. M. Robeson et al, titled "Polyarylethersulfone Polymer Solution" (commonly assigned).

This application describes solutions for coating compositions comprising select polyarylethersulfones dissolved in methylene chloride or N,N-dimethyl formamide. The following poly(aryl ether sulfone) is specifically depicted in Ser. No. 536,843:

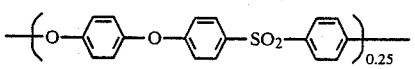

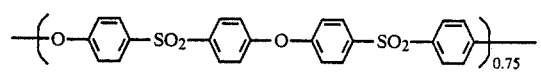

This poly(aryl ether sulfone) was found to dissolve in methylene chloride and remain totally dissolved therein even after two months.

However, it recently has come to light that methylene chloride has potential toxicity problems (see for example, Chemical Week, "Methylene Chloride in Limbo", May 8, 1985). Thus, it should be highly desirable to replace methylene chloride with another commonly available, non-toxic and low boiling solvent. Cyclohexanone has been found in this invention to be such a solvent.

In the following U.S. Patents solutions of poly(aryl ether sulfones) are described:

U.S. Pat. No. 3,875,103 describes a solution for coating comprising at least one thermoplastic amorphous aromatic polysulfone dissolved in a solvent mixture comprising: (a) 70 to 85% by volume of a mixture of (i) at least one cyclic aliphatic ketone having a ring containing 5 to 7 carbon atoms and having a boiling point, at atmospheric pressure, of less than 200° C. and (ii) at least one inert liquid compound containing a polar group selected from —SO—, —SO$_2$—, —CO, N and N— groups and having a boiling point, at atmospheric pressure, of less than 210° C., the cyclic aliphatic ketone to inert liquid compound volume ratio being 70:30 to 95:5, and (b) 30 to 15% by volume of at least one dialkyl ketone having a boiling point, at atmospheric pressure, of less than 150° C., the concentration of the polysulphone being 5 to 25 g in 100 cm$^3$ of solvent mixture.

In the sole example of this patent, a poly(aryl ether sulfone) corresponding to structural formula (I), depicted above, is dissolved in a mixture of cyclohexanone and dimethyl sulphoxide at 80° C. to form a solution. The solution is cooled to 50° C. and methyl ketone is added. Thus, three different solvents are required to prepare the poly(aryl ether sulfone) solution.

U.S. Pat. No. 3,993,843 describes an aqueous dispersion of a polysulfone resin. The dispersion is described as containing 10-60% by weight of a film forming binder which is an aromatic polysulfone resin dispersed in 37-89.9% by weight of water. The dispersed binder particles have a particle size of about 0.02-0.5 microns and are dispersed by about 0.1-3.0% by weight of a surfactant. The patent also describes a process for preparing an aqueous dispersion from an aromatic polysulfone resin. In this process, the polysulfone resin is dissolved in a water miscible solvent such as methylene chloride, tetrahydrofuran, cyclohexane, dimethyl formamide, or dimethyl acetamide to form a solution having a polymer solids content of about 10-30% by weight. The solution is then diluted with a water immiscible solvent such as toluene, xylene and trichlomethylene to a 2-9% polymer solids content. This solution is then added, under high shear mixing conditions, to a solution of 95–99% by weight of water and 1–5% by weight of a nonionic or anionic surfactant to form an emulsion.

In example 1 of U.S. Pat. No. 3,983,843, the poly(aryl ether sulfone) structurally depicted as (II) above is dissolved in methylene chloride and heated for one hour to form a solution. This solution is then mixed with acetone, toluene and methylene chloride to form portion 2. Portion 2 contains water and surfactant. Portion 1 is added to Portion 2 under high shear mixing conditions to form an emulsion. This patent does not disclose the poly(aryl ether sulfones) of this invention nor the use of cyclohexanone as a solvent.

THE INVENTION

In the present invention it has been found that a select group of poly(aryl ether sulfones) form stable solutions in cyclohexanone. Cyclohexanone is a non-toxic, commercially available, low boiling solvent and is an excellent replacement for methylene chloride. The solutions of this invention have long shelf life and can be readily used in coatings and cast into films, which films have a good combination of physical properties. In comparison, the poly(aryl ether sulfone) structurally depicted as (I) rapidly crystallizes out of a cyclohexanone solution.

The poly(aryl ether sulfones) of this invention which readily dissolve in cyclohexanone are represented by the following formula:

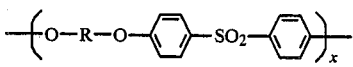

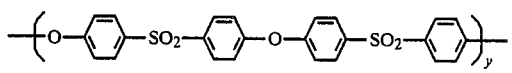

wherein R is selected from the following:

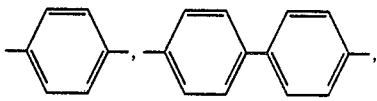

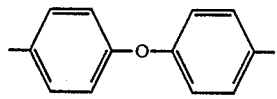

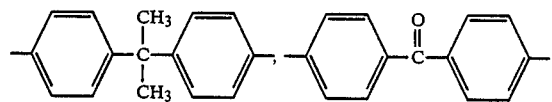

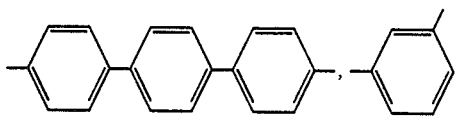

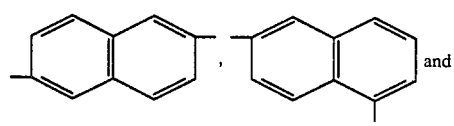

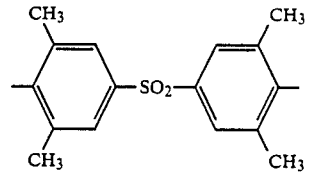

wherein the ratio of x to y is 10:90 to 60:40, preferably 20:80 to 50:50, and most preferably, 25:75 to 40:60.

In this invention it has been found that the incorporation of greater than 10 to less than about 60 mole percent of the "R" moiety depicted above, into poly(aryl ether sulfone) (I), i.e.,

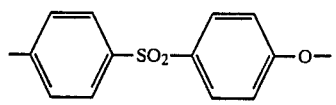

breaks up the crystallinity of poly(aryl ether sulfone) (I) so that it readily dissolves in cyclohexanone and remains in solution for extended periods of time.

The poly(aryl ether sulfone) is dissolved in cyclohexanone in concentrations of from about 5 to about 40 wt. percent, preferably from about 10 to about 30 wt. percent. After the polymer is added to the cyclohexanone it is generally heated to a temperature in the range of from about 80 to about 100° C. to effect dissolution.

If desired, the cyclohexanone solution can be used with up to about 5 to 10 wt. percent of another solvent such as chlorobenzene or sulfolane.

It is desirable that the poly(aryl ether sulfone) have a glass transition temperature (Tg) equal to or greater than 200° C. Films made from poly(aryl ether sulfones) with a Tg equal to or greater than 200° C. are used in many high temperature applications where film distortion is required to be minimal. At temperature exposure exceeding the Tg of the polymer, severe distortion of the film could result as well as loss of any load bearing capabilities. Load bearing capabilities of a film are important in applications such as in printed circuits where solder baths at elevated temperatures would distort the film resulting in circuit pattern distortion. The following polymers exhibit Tg values of 200° C.:

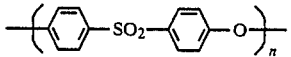

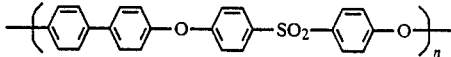

However, these polymers do not have adequate stability in cyclohexanone. The poly(aryl ether sulfone) polymers described herein have Tg's>200° C. and have excellent stability in cyclohexanone.

The polymers of this invention are prepared by contacting substantially equimolar amounts of the hydroxy containing compounds and 4,4'-dichloro or 4,4'-dinitro diphenyl sulfone with from about 0.5 to about 1.0 mole of an alkali metal carbonate per mole of hydroxyl group in a solvent mixture comprising a solvent which forms an azeotrope with water in order to maintain the reaction medium under substantially anhydrous conditions during the polymerization and a polar aprotic solvent.

The dihydroxy compounds include the following:
bisphenol-A
hydroquinone
dihydroxy diphenyl sulfone
biphenol The dihalo or dinitro compounds include:
4,4'-dichloro or 4,4'-dinitro
diphenyl sulfone.

The temperature of the reaction mixture is kept at from about 120° to about 180° C., for about 1 to about 5 hours and then raised and kept at from about 200° to about 250° C., preferably from about 205° to about 230° C., for about 1 to 10 hours.

The reaction is carried out in an inert atmosphere, e.g., nitrogen, at atmospheric pressure, although higher or lower pressures may also be used.

The polyarylethersulfone is then recovered by conventional techniques such as coagulation, solvent evaporation, and the like.

The solvent mixture comprises a solvent which forms an azeotrope with water and a polar aprotic solvent. The solvent which forms an azeotrope with water includes an aromatic hydrocarbon such as benzene, toluene, xylene, ethylbenzene, chlorobenzene, and the like.

The polar aprotic solvents employed in this invention are those generally known in the art for the manufacture of polyarylether sulfones and include sulfur containing solvents such as those of the formula:

in which each $R_1$ represents a monovalent lower hydrocarbon group free of aliphatic unsaturation, which preferably contains less than about 8 carbon atoms or when connected together represents a divalent alkylene group with b being an integer from 1 to 2 inclusive. Thus, in all of these solvents all oxygens and two carbon atoms are bonded to the sulfur atom. Aromatic sulphone containing solvents of the following formula may be used.

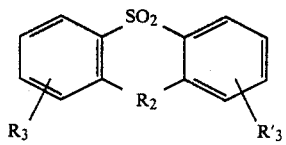

where $R_2$ is a direct link, an oxygen atom or two hydrogen atoms (one attached to each benzene ring) and $R_3$ and $R'_3$, which may be the same or different, are hydrogen atoms or phenyl groups. Specifically, these solvents include dimethylsulfoxide, dimethylsulfone, diphenylsulfone, diethylsulfoxide, diethylsulfone, diisopropylsulfone, tetrahydrothiophene 1,1-dioxide (commonly called tetramethylene sulfone or sulfolane) and tetrahydrothiophene-1 monoxide.

Additionally, nitrogen containing solvents may be used. These include N,N-dimethylacetamide, N,N'-dimethylformamide and N-methylpyrrolidone.

The azeotrope forming solvent and polar aprotic solvent are used in a weight ratio of from about 1:10 to about 1:1, preferably from about 1:7 to about 1:5.

In the reaction, the hydroxy containing compound is slowly converted, in situ, to the alkali metal salt thereof by reacting with the alkali metal carbonate. The alkali metal carbonate is preferably potassium carbonate. Mixtures of carbonates such as potassium and sodium carbonate may also be used.

Water is continuously removed from the reaction mass as an azeotrope with the azeotrope forming solvent so that substantially anhydrous conditions are maintained during the polymerization.

It is essential that the reaction medium be maintained substantially anhydrous during the polycondensation. While amounts of water up to about one percent can be tolerated, and are somewhat beneficial when employed with fluorinated dihalobenzenoid compounds, amounts of water substantially greater than this are desirably avoided as the reaction of water with the halo and/or nitro compound leads to formation of phenolic species and only low molecular weight products are secured. Consequently, in order to secure the high polymers, the system should be substantially anhydrous, and preferably contain less than 0.5 percent by weight water during the reaction.

Preferably, after the desired molecular weight has been attained, the polymer is treated with an activated aromatic halide or an aliphatic halide such as methyl chloride or benzyl chloride, and the like. Such treatment of the polymer converts the terminal hydroxyl groups into ether groups which stabilize the polymer. The polymers so treated has good melt and oxidative stability.

The polymers of this invention are known in the art and are described in, for example, European Patent Application No. 47999 published Mar. 24, 1982 which is equivalent to Ser. No. 536,843, discussed above.

The polymers of this invention have a reduced viscosity of at least 0.25 dl/gm, preferably from about 0.35 to about 1.4 dl/g as measured in an appropriate solvent, such as chloroform, at 0.2 g per 100 ml., at 25° C.

EXAMPLES

The following examples serve to give specific illustrations of the practice of this invention but they are not intended in any way to limit the scope of this invention.

The following designations used in the Examples have the following meaning:

Control A: A polymer having the following repeat unit:

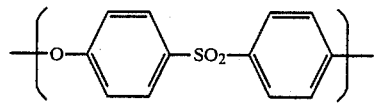

The polymer has a reduced viscosity of 0.48 dl/g as measured in N-methyl pyrrolidone (0.2 g/100 ml) at 25° C.

Control B: A polymer having the following repeat unit:

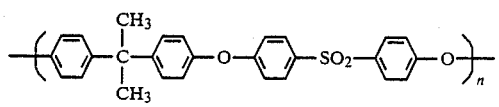

The polymer has a reduced viscosity of 0.48 dl/g as measured in chloroform (0.2 g/100 ml) at 25° C.

Polyarylethersulfone I: A polymer having the following repeating unit:

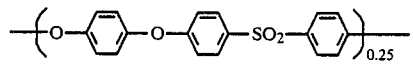

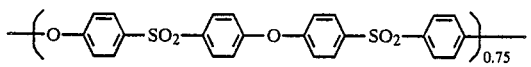

The polymer has a reduced viscosity of 0.49 dl/g as measured in chloroform (0.2 g/100 ml) at 25° C.

Polyarylethersulfone II: A polymer having the following repeat unit:

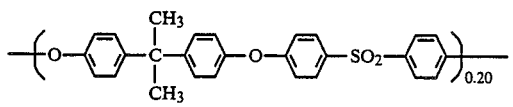

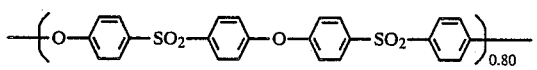

The polymer has a reduced viscosity of 0.52 dl/g as measured in chloroform (0.2 g/100 ml) at 25° C.

Polyarylethersulfone III: A polymer having the following repeat unit:

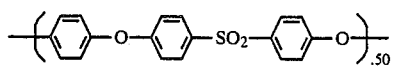

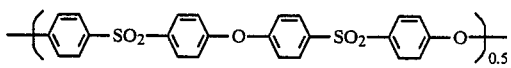

The polymer has a reduced viscosity of 0.55 as measured in NMP (0.2 g/100 ml) at 25° C.

Polyarylethersulfone IV: A polymer having the following repeat unit:

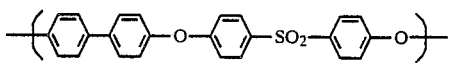

The polymer has a reduced viscosity of 0.56 as measured in N-methyl pyrrolidone (0.2 g/100 ml) at 25° C.

Polyarylethersulfone V: A polymer having the following repeat unit:

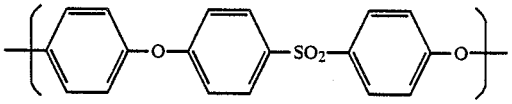

The polymer has a reduced viscosity of 1.04 as measured in N-methyl pyrrolidone (0.2 g/100 ml) at 25° C.

EXAMPLE 1 AND CONTROL Solutions of Polyarylethersulfone I and Control A in cyclohexanone were prepared at concentrations of 10 gms, 15 gms and 20 gms per 100 ml of cyclohexanone. The six samples were heated to 80°-100° C. and dissolved and allowed to cool.

The six solutions were then heated to 80°-90° C. All of the solutions containing Control A started crystallizing out of solution within an hour after cooling down to room temperature (23° C.). Within three hours the three solutions containing Control A were all solid, non-pourable materials.

The solutions which contained Polyarylethersulfone I were pourable and exhibited no sign of crystallization. After 20 hours the solution which was most concentrated in Polyarylethersulfone I (20 gm/100 ml) exhibited a few small crystals. The other two solutions containing Polyarylethersulfone I, i.e., 10 gm/100 ml and 15 gm/100 ml, showed no signs of crystals.

After 68 hours, the Polyarylethersulfone I solution at a concentration of 15 gm/100 ml exhibited some crystalline precipitate. The sample at a concentration of 10 gm/100 ml exhibited no signs of crystals. After 360 hours, the Polyarylethersulfone I solution at a concentration of 10 gm/100 ml exhibited crystallinity.

The samples of Polyarylethersulfone I at a concentration of 20 gm/100 ml cyclohexanone and Control A at a concentration of 20 gm/100 ml cyclohexanone were heated to >80° C. The samples were poured onto 6×6 inch glass plates. The samples were then allowed to evaporate at room temperature. The Polyarylethersulfone I solution yielded a clear tough film whereas the Control A solution yielded a powdery material on the glass plate. This clearly demonstrates an advantage of Polyarylethersulfone I over Control A. Cyclohexanone is a viable casting solvent for Polyarylethersulfone I and can be used to prepare high quality films.

Samples of Control A, Control B, and Polyarylethersulfone I, II, III, IV, and V were heated to 80°-100° C. and dissolved in cyclohexanone (15 gm/100 ml). Only the hydroquinone based poly(aryl ether sulfone) did not dissolve in cyclohexanone.

After the samples were dissolved, they were all heated to 100° C. and allowed to cool to room temperature. The visual appearances of the samples after removal from the 100° C. oven after various time intervals are tabulated in Table I. Polyarylethersulfone I exhibited initial crystallization after 46 hours at room temperature. Polyaryethersulfone III exhibited no crystallization after over two months at room temperature.

Representative values for glass transition temperature (Tg) and toughness of the polymers investigated herein are listed in Table II. For film applications the desired Tg is ≧200° C.

The polymers were tested as follows. The polymers were molded into a 4×4×0.020 inch plaque in a cavity mold at 380° C. The molding was done in a South Bend hydraulic press with heated platens. After pressing the plaque, the mold was cooled over a period of about 5 minutes to room temperature by passing water through the platens. The molded plaque was shear cut into ½ inch wide strips. These strips were tested for pendulum impact strength [(pendulum impact strength is measured as follows: A steel pendulum is used, cylindrical in shape with a diameter of 0.83 inch and weighing 1.562 pounds; the striking piece, mounted almost at the top of the pendulum is a cylinder 0.3 inch in diameter; film specimens, 4 inches long, 0.125 inch wide and about 1 to 30 mils thick are clamped between the jaws of the tester so that the jaws are spaced 1 inch apart; the 0.125 inch width of the film is mounted vertically; the pendulum is raised to a constant height to deliver 1.13 foot pounds at the specimen; when the pendulum is released the cylindrical striking piece hits the specimen with its flat end, breaks the film, and travels to a measured height beyond; the differences in the recovery height (i.e., the difference in the potential energy of the pendulum at the maximum point of the upswing) represent the energy absorbed by the specimen during the rupture; the impact strength, expressed in foot-pounds per cubic inch, is obtained by dividing the pendulum energy loss by the volume of the specimen].

The glass transition temperature was also determined on the samples by DSC as follows: A sample of the molded plaque was placed in a DSC pan, heated above its $T_m$ (about 400° C.) and then cooled rapidly to room temperature to prevent crystallization. The sample was then heated at 10° C./min. and the Tg determined by the onset of the discontinuity in the specific heat.

TABLE I

| Polymer | Time (minutes) | | | | | | | | |
|---|---|---|---|---|---|---|---|---|---|
| | 30 | 60 | 75 | 90 | 120 | 150 | 180 | 360 | 22 hours |
| Control A | NC | NC | Crystals forming | Large number of crystals forming | Partially pourable | Nonpourable | — | — | — |
| Control B | NC | NC | NC | NC | NC | NC | NC | NC | NC |
| Polyarylethersulfone I | NC | NC | NC | NC | NC | NC | NC | NC | NC |
| Polyarylethersulfone II | NC | NC | NC | NC | NC | NC | NC | NC | Crystals forming |
| Polyarylethersulfone III | NC | NC | NC | NC | NC | NC | NC | NC | NC |
| Polyarylethersulfone IV | Slight hazing of solution | Crystallized non-pourable | — | — | — | — | — | — | — |

NC = no change

TABLE II

| Polymer | R.V. | Pendulum Impact Strength (ft-lbs/in³) | Tg (°C.) |
|---|---|---|---|
| Control A | 0.50 | 166 | 220°–225° C. |
| Control B | 0.50 | 180 | 180°–185° C. |
| Polyarylethersulfone I | 0.48 | 150 | 220° C. |
| Polyarylethersulfone II | 0.52 | 191 | 220° C. |
| Polyarylethersulfone IV | 1.04 | 170 | 190° C. |
| Polyarylethersulfone V | 0.67 | 211 | 220° C. |
| *Polyarylethersulfone Va | 0.60 | 225 | 195° C. |
| ¹Hydroquinone-biphenol 25/75 based polysulfone | 0.58 | 105 | 210° C. |
| ²Hydroquinone-biphenol 50/50 based polysulfone | 0.601 | 185 | 205° C. |

*This polymer has the same structure as Polyarylethersulfone V except that its reduced viscosity is 0.60 dl/g instead of 0.67 dl/g.

¹This polymer has the following formula:

$$-\left(\left(\bigcirc\right)-O-\left(\bigcirc\right)-SO_2-\left(\bigcirc\right)-O\right)_{.25}$$

$$-\left(\left(\bigcirc\right)-\left(\bigcirc\right)-O-\left(\bigcirc\right)-SO_2-\left(\bigcirc\right)-O\right)_{.75}$$

²This polymer has the following formula:

$$-\left(\left(\bigcirc\right)-O-\left(\bigcirc\right)-SO_2-\left(\bigcirc\right)-O\right)_{.50}$$

$$-\left(\left(\bigcirc\right)-\left(\bigcirc\right)-O-\left(\bigcirc\right)-SO_2-\left(\bigcirc\right)-O\right)_{.50}$$

What is claimed is:

1. A solution comprising at least one poly(aryl ether sulfone) dissolved in a cyclohexanone solvent alone or cyclohexanone solvent with up to about 5 to 10 wt. percent of another solvent, wherein the poly(aryl ether sulfone) is represented by the following formula:

$$-\left(O-R-O-\left(\bigcirc\right)-SO_2-\left(\bigcirc\right)\right)_x-$$

-continued $$-\left(O-\left(\bigcirc\right)-SO_2-\left(\bigcirc\right)-O-\left(\bigcirc\right)-SO_2-\left(\bigcirc\right)\right)_y-$$

wherein R is selected from the following:

[biphenyl and terphenyl structures]

[diphenyl ether, isopropylidene diphenyl, benzophenone, terphenyl, dimethylphenyl and tetramethyl-sulfone-diphenyl, and naphthalene structures]

wherein the ratio of x to y is 10:90 to 60:40.

2. A solution as described in claim 1 wherein the poly(aryl ether sulfone) is of the following formula:

$$-\left(O-\left(\bigcirc\right)-O-\left(\bigcirc\right)-SO_2-\left(\bigcirc\right)\right)_{0.25}-$$

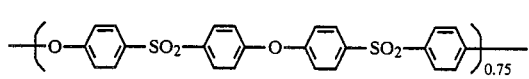

3. A solution as described in claim 1 wherein the poly(aryl ether sulfone) is of the following formula:

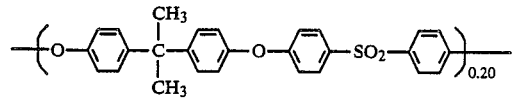

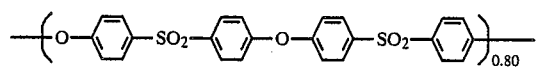

4. A solution as described in claim 1 wherein the poly(aryl ether sulfone) is of the following formula:

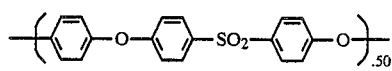

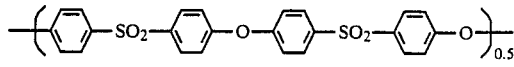

5. A solution as described in claim 1 wherein the poly(aryl ether sulfone) is of the following formula:

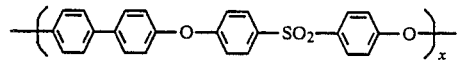

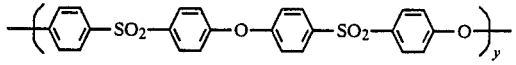

6. A solution as described in claim 1 wherein the poly(aryl ether sulfone) is of the following formula:

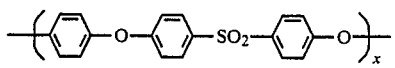

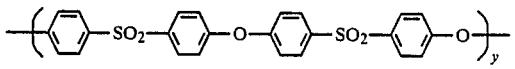

7. A solution as described in claim 1 which contains from about 5 to about 40 wt. percent of the poly(aryl ether sulfone).

8. A film formed from the solution of claim 1.

* * * * *